US006553865B1

(12) United States Patent
Endreszl

(10) Patent No.: US 6,553,865 B1
(45) Date of Patent: Apr. 29, 2003

(54) COVER PAN MOUNTED VENT CONNECTOR

(75) Inventor: Joseph M. Endreszl, Belleville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 29 days.

(21) Appl. No.: 09/652,200

(22) Filed: Aug. 31, 2000

(51) Int. Cl.$^7$ .................... F16H 57/02; F16H 57/04
(52) U.S. Cl. ................. 74/607; 74/606 R; 74/606 A
(58) Field of Search .................... 74/606 A, 606 R, 74/607; 184/104.1; 165/47, 170, 168; 137/583; 475/231

(56) References Cited

U.S. PATENT DOCUMENTS

| | | | |
|---|---|---|---|
| 3,686,973 A | * | 8/1972 | Davison et al. ............ 74/606 R |
| 3,916,724 A | * | 11/1975 | Muller et al. .............. 74/606 R |
| RE30,177 E | | 12/1979 | Morse et al. |
| 4,351,203 A | * | 9/1982 | Fukunaga .................. 74/606 R |
| 4,503,944 A | | 3/1985 | Burckhardt et al. |
| 4,506,562 A | * | 3/1985 | Yamaura et al. ........... 74/606 R |
| 4,554,844 A | * | 11/1985 | Hamano ..................... 74/606 A |
| 4,595,118 A | * | 6/1986 | Azuma et al. .............. 220/374 |
| 4,620,616 A | | 11/1986 | Martin |
| 4,700,813 A | | 10/1987 | Rath |
| 4,805,747 A | | 2/1989 | Moedinger et al. |
| 4,950,035 A | | 8/1990 | Villarreal et al. |
| 4,957,473 A | * | 9/1990 | Takemura et al. ........... 475/231 |
| 4,970,913 A | * | 11/1990 | Kielar et al. ............... 74/606 R |
| 4,989,711 A | * | 2/1991 | Schulz et al. ............. 192/105 F |
| 5,024,345 A | * | 6/1991 | Deweerdt .................... 220/366 |
| 5,121,972 A | | 6/1992 | Glover |
| 5,129,422 A | * | 7/1992 | Davison et al. ............. 137/599 |
| 5,172,984 A | | 12/1992 | Lederman |
| 5,220,854 A | * | 6/1993 | Allart et al. ............... 74/606 R |
| 5,509,949 A | * | 4/1996 | Gluys et al. ............... 55/385.3 |
| 5,538,330 A | | 7/1996 | Ehrlich |
| 5,562,561 A | * | 10/1996 | Gillard ........................ 475/231 |
| 5,709,135 A | * | 1/1998 | Baxter .......................... 74/607 |
| 5,724,864 A | * | 3/1998 | Rodgers et al. ............ 74/606 R |
| 6,015,444 A | * | 1/2000 | Craft et al. .................... 55/320 |
| 6,058,805 A | * | 5/2000 | Merkler ........................ 74/607 |
| 6,058,969 A | * | 5/2000 | Bollwahn et al. ........... 137/583 |
| 6,105,464 A | * | 8/2000 | Shimizu .................... 74/606 R |

* cited by examiner

Primary Examiner—Vinh T. Luong
(74) Attorney, Agent, or Firm—Harness, Dickey & Pierce, P.L.C.

(57) ABSTRACT

An axle assembly having a carrier housing, an axle housing and a differential assembly and a cover assembly. The carrier housing has an access aperture for receiving the differential assembly. The axle housing is fixedly coupled to the carrier housing and is in fluid connection therewith. The cover assembly closes the access aperture and includes a venting device for venting the carrier housing and the axle housing.

6 Claims, 2 Drawing Sheets

COVER PAN MOUNTED VENT CONNECTOR

BACKGROUND OF THE INVENTION

1. Technical Field

The present invention relates generally to motor vehicle drive trains and more particularly to an axle assembly wherein the axle vent is mounted to a carrier housing.

2. Discussion

Axle assemblies are typically partially filled with a lubricating fluid to lubricate various gears, pinions and bearings during the operation of a vehicle. Under normal operating conditions, the temperature of the fluids in the axle assembly (i.e., the lubricating fluid and air) increase, causing the fluids to expand. The fluids subsequently cool and contract after the vehicle is maintained in an inoperative state for a period of time. Generally, axe assemblies are equipped with a vent connector that is mounted directly to the carrier housing or the axle housing to permit air to exit and enter the axle assembly when the fluids contained therein expand and contract. While this solution has been generally effective in its employment, several drawbacks have been noted.

One such drawback concerns a situation wherein a leak occurs at the intersection between the carrier or axle housing and the vent. Leaks may occur as a result of porosity in the cast housing or an improperly machined hole into which the vent is press-fit or threadably engaged. Often times the leak is small and not readily noticeable. In such situations it is possible for water to pass into the housing and intermingle with the lubricating fluid to thereby reduce its effectiveness. If the leak is detected, it is relatively common to scrap the housing. As the housings are machined from castings which are typically expensive and as the housings are typically fully machined at the point when the leak is detected, the scraping of a housing is expensive.

Anther drawbacks concern the difficulty of machining the hole for the vent into the housing. Typically these holes are formed in a contoured area of the housing which can cause difficulties in the hole forming process. Twist drills typically wander from their intended target position when they are employed to drill a hole on a curved surface. Drills which wander typically drill an oval-shaped and oversized hole in the housing, which increases the risk that the intersection between the housing and the vent will leak. Furthermore, wandering greatly reduces the life of the twist drill and the drill bushings.

Accordingly, there remains a need in the art for an axle assembly which may be vented in a cost-effective manner without forming a hole in the carrier housing or axle housing.

SUMMARY OF THE INVENTION

In one form, the present invention provides an axle assembly having a carrier housing, an axle housing and a differential assembly and a cover assembly. The carrier housing has an access aperture for receiving the differential assembly. The axle housing is fixedly coupled to the carrier housing and is in fluid connection therewith. The cover assembly closes the access aperture and includes a venting device for venting the carrier housing and the axle housing.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
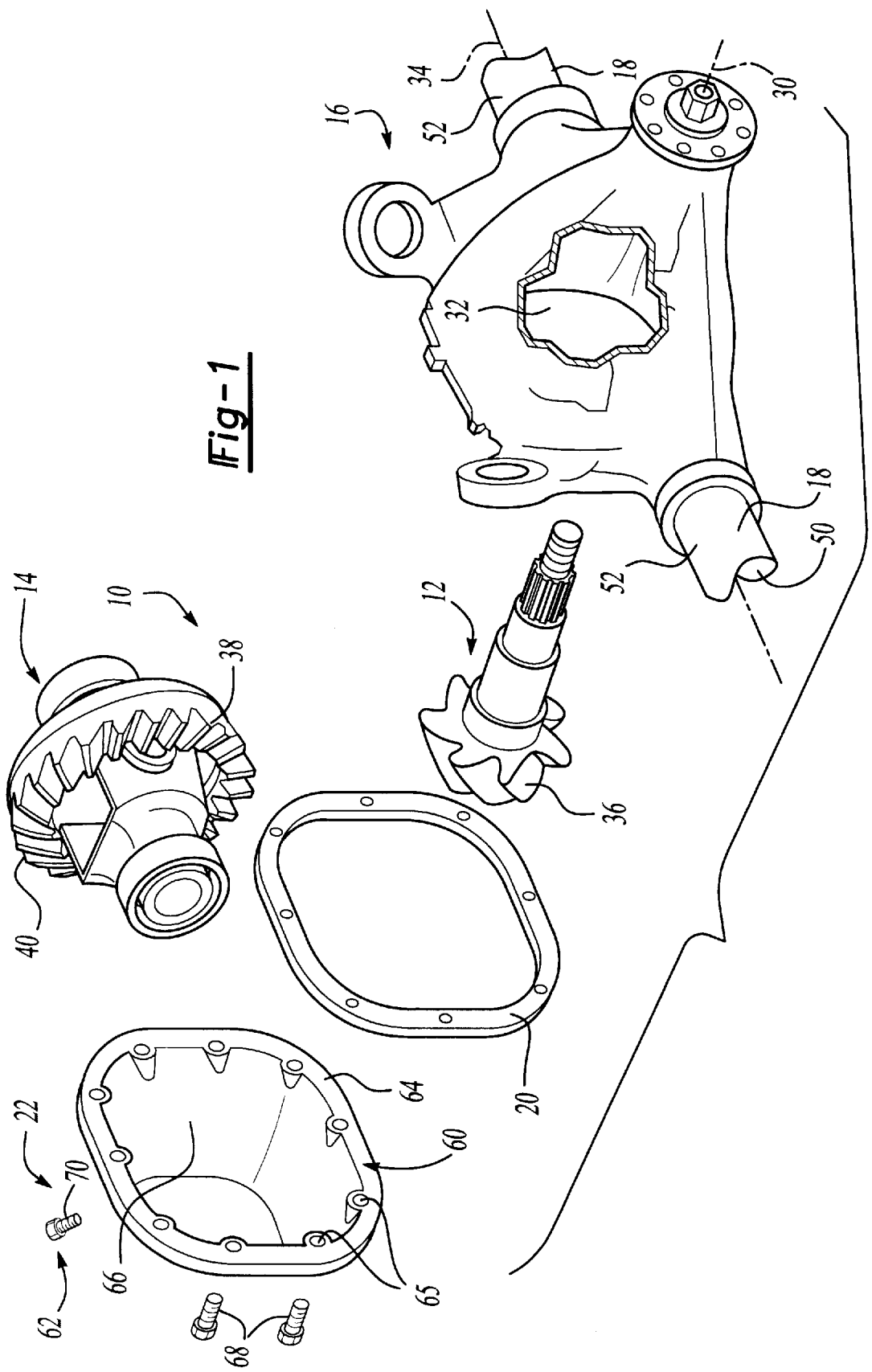
FIG. 1 is an exploded perspective view of an axle assembly constructed in accordance with the teachings of the present invention.

With reference to FIG. 1 of the drawings, an axle assembly constructed in accordance with the teachings of the present invention is generally indicated by reference numeral 10. Axle assembly 10 is shown to include a pinion gear 12, a differential assembly 14, a carrier housing 16, a pair of axle housings 18, a cover gasket 20 and a cover assembly 22. Pinion gear 12 is conventionally operable for receiving a drive line torque input from a driveshaft (not shown) which is transmitted to differential assembly 14 and diverted to a pair of axle shafts (not shown).

Figure 2:
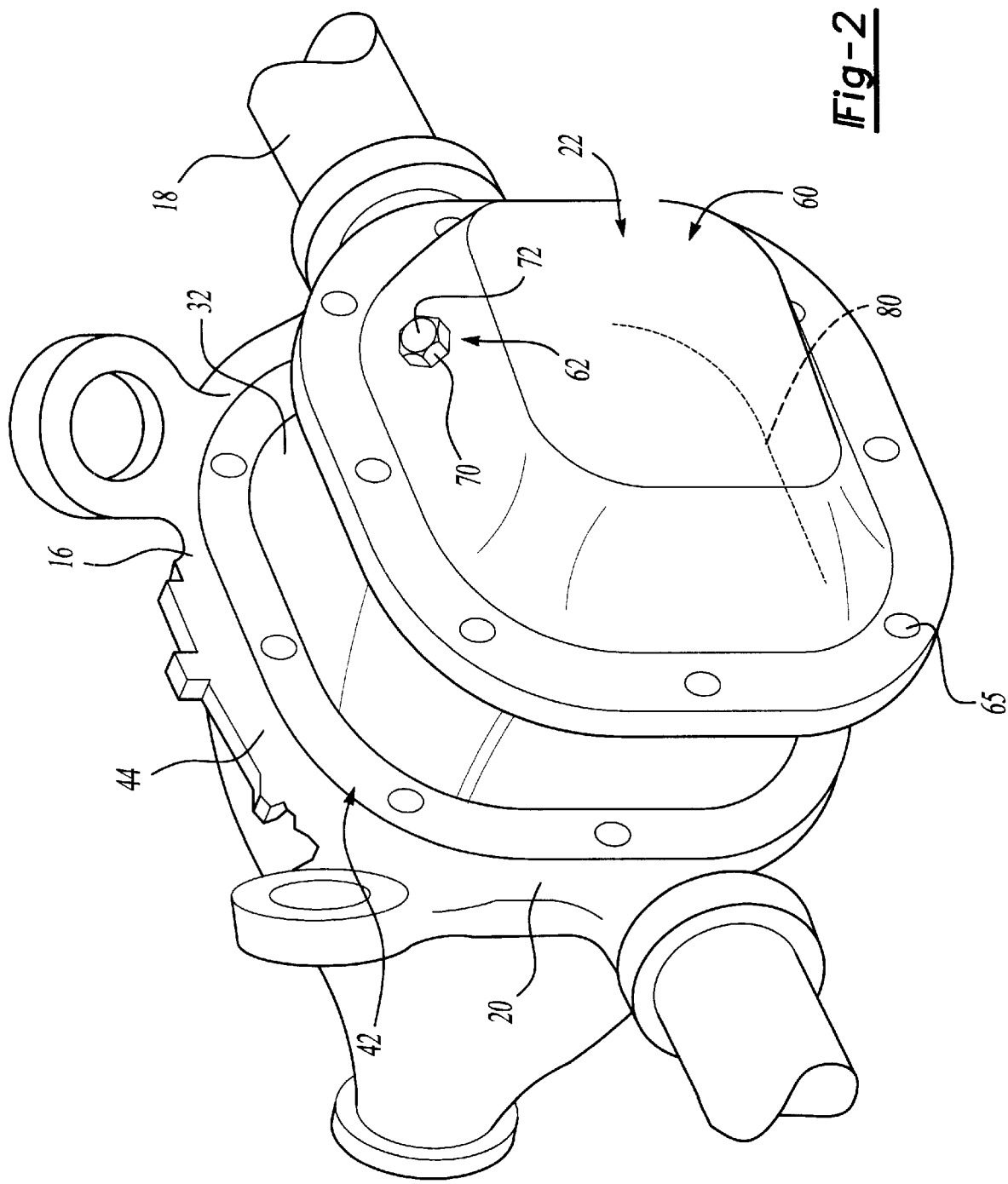
FIG. 2 is an exploded perspective view of a portion of the axle assembly of FIG. 1 illustrating the cover assembly and carrier housing in greater detail.

Carrier housing 16 supports pinion gear 12 for rotation about a first axis 30 within a carrier cavity 32. Carrier housing 16 also supports differential assembly 14 for rotation about a second axis 34 within carrier cavity 32. The teeth 36 of pinion gear 12 meshingly engage the teeth 38 of the ring gear 40 of differential assembly 14 to permit drive torque to be transmitted therethrough. With additional reference to FIG. 2, carrier cavity 32 is shown to terminate at an access aperture 42 for receiving differential assembly 14. Access aperture 42 terminates at a machined face 44.

Axle housings 18 are generally tubular structures having a hollow interior 50. The proximal ends 52 of axle housings 18 are coupled to carrier housing 16 such that the hollow interior 50 of the axle housings 18 is in fluid communication with carrier cavity 32.

Cover assembly 22 includes a cover member 60 and a ventilating device 62. Cover member 60 is formed via stamping, casting or molding to include a flange portion 64 with apertures 65 and a contoured portion 66. A plurality of threaded fasteners 68 are employed to fasten cover member 60 to carrier housing 16. The clamping force generated by the plurality of threaded fasteners 68 permits flange portion 64 to cooperate with cover gasket 20 to sealingly engage machined face 44. Contoured portion 66 is configured in a manner which permits cover member 60 to avoid contacting differential assembly 14 when cover assembly 22 is installed to carrier housing 16.

In the particular embodiment illustrated, venting device 62 is shown to include an externally threaded body portion 70 and a valve assembly 72. Body portion 70 is threadably engaged to a threaded aperture (not specifically shown) formed in cover member 60. The threaded aperture may be formed directly into a wall which defines contoured portion 66 or may be a separately formed boss or lug (not shown) which is machined and fastened to contoured portion 66 via a conventional fastening process, such as welding.

Valve assembly 72 is a normally closed valve which is employed to vent carrier cavity 32 and the hollow interior 50 of axle housings 18 on the occurrence of a predetermined condition. In the particular example provided, valve assembly 72 opens in response to a positive pressure within carrier housing 16 in excess of a predetermine first pressure threshold. Valve assembly 72 also opens in response to a pressure within carrier housing 16 that is less than a predetermined second pressure threshold. Venting device 62 is positioned on cover member 60 above a predetermined fluid operating position 80 so as not to inhibit the free entry and egress of air into and out of carrier cavity 32.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In an axle assembly having a carrier housing, an axle housing and a differential assembly, the carrier housing having an access aperture for receiving the differential assembly, the axle housing coupled to the carrier housing such that an interior of the axle housing and carrier housing are in fluid connection with one another enabling fluid passage between interiors of said axle housing and said carrier housing, a cover assembly for closing the access aperture, the cover assembly including a venting device for venting the interiors of said carrier housing and the axle housing said cover assembly including a flange with a plurality of apertures which enable a plurality of fasteners to secure the cover to said carrier housing enabling ready removal of said cover assembly.

2. The axle assembly of claim 1, wherein the cover assembly further includes a cover member which threadably engages the venting device.

3. The cover assembly of claim 2, wherein the cover member is contoured to avoid contacting the differential assembly.

4. The cover assembly of claim 2, wherein the venting device is positioned on the cover member above a fluid operating position.

5. The axle assembly of claim 1, wherein the venting device includes a valve member that is normally maintained in a closed condition to thereby inhibit fluid communication through the venting device.

6. An axle assembly comprising:

a differential assembly;

an axle housing;

a carrier housing having an access aperture for receiving the differential assembly, the axle housing coupled to the carrier housing such that an interior of the axle housing and carrier housing are in fluid connection with one another enabling fluid passage between interiors of said axle housing and said carrier housing; and a cover assembly for closing the access aperture, the cover assembly including a cover member, said cover assembly including a flange with a plurality of apertures which enable a plurality of fasteners to secure the cover to said carrier housing enabling ready removal of said cover assembly a venting device and a plurality of threaded fasteners, the plurality of threaded fasteners fixedly but removably couple the cover assembly to the carrier housing, the cover member being contoured to avoid contacting the differential assembly, the cover member threadably engaging the venting device, the venting device being positioned on the cover member above a fluid operating position, the venting device including a valve member that is normally disposed in a closed condition for venting the interiors of the carrier housing and the axle housing, the valve member opening in response to a positive pressure within the carrier housing in excess of a predetermine first pressure threshold and the valve member opening in response to a pressure within the carrier housing that is less than a predetermined second pressure threshold.

* * * * *